(12) United States Patent
Seem

(10) Patent No.: US 8,096,140 B2
(45) Date of Patent: *Jan. 17, 2012

(54) ADAPTIVE REAL-TIME OPTIMIZATION CONTROL

(75) Inventor: John E. Seem, Glendale, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/912,634

(22) Filed: Oct. 26, 2010

(65) Prior Publication Data

US 2011/0036108 A1 Feb. 17, 2011

Related U.S. Application Data

(63) Continuation of application No. 11/699,860, filed on Jan. 30, 2007, now Pat. No. 7,827,813.

(51) Int. Cl.
F25D 17/00 (2006.01)
F25D 17/04 (2006.01)
F24F 7/00 (2006.01)
F24F 3/14 (2006.01)
F24F 11/00 (2006.01)

(52) U.S. Cl. ....... 62/186; 62/176.5; 236/49.3; 236/44 C; 454/258

(58) Field of Classification Search ............... 62/186, 62/176.6; 454/258; 236/44 C
See application file for complete search history.

(56) References Cited

U.S. PATENT DOCUMENTS

| | | |
|---|---|---|
| 2,812,141 A | 11/1957 | Sueda et al. |
| 3,181,791 A | 5/1965 | Axelrod |
| 4,026,251 A | 5/1977 | Schweitzer et al. |
| 4,114,807 A | 9/1978 | Naseck et al. |
| 4,182,180 A | 1/1980 | Mott |
| 4,199,101 A | 4/1980 | Bramow et al. |
| 4,257,238 A | 3/1981 | Kountz et al. |
| 4,319,461 A | 3/1982 | Shaw |
| 4,512,161 A | 4/1985 | Logan et al. |
| 4,558,595 A | 12/1985 | Kompelien |
| 4,607,789 A | 8/1986 | Bowman |
| 4,872,104 A | 10/1989 | Holsinger |
| 4,876,858 A | 10/1989 | Shaw et al. |
| 4,942,740 A | 7/1990 | Shaw et al. |
| 5,251,814 A | 10/1993 | Warashina et al. |
| 5,346,129 A | 9/1994 | Shah et al. |
| 5,351,855 A | 10/1994 | Nelson et al. |
| 5,355,305 A | 10/1994 | Seem et al. |

(Continued)

FOREIGN PATENT DOCUMENTS

JP 63-231127 A 9/1988

(Continued)

OTHER PUBLICATIONS 90.1 User's Manual, Energy Standard for Buildings Except Low-Rise Residential Buildings, ANSI/ASHRAE/IESNA Standard 90.1-2004, 7 pages.

(Continued)

*Primary Examiner* — Frantz Jules
*Assistant Examiner* — Alexis Cox
(74) *Attorney, Agent, or Firm* — Foley & Lardner LLP

(57) ABSTRACT

A system for regulating the amount of outdoor air that is introduced into a building determines characteristics of the outdoor air using sensor inputs. The system uses extremum seeking control logic to vary the flow of outdoor air provided into the building in response to the cooling load determinations.

9 Claims, 12 Drawing Sheets

FIGURE 10

U.S. PATENT DOCUMENTS

| | | | |
|---|---|---|---|
| 5,414,640 | A | 5/1995 | Seem |
| 5,461,877 | A | 10/1995 | Shaw et al. |
| 5,467,287 | A | 11/1995 | Wenner et al. |
| 5,506,768 | A | 4/1996 | Seem et al. |
| 5,555,195 | A | 9/1996 | Jensen et al. |
| 5,568,377 | A | 10/1996 | Seem et al. |
| 5,590,830 | A | 1/1997 | Kettler et al. |
| 5,675,979 | A | 10/1997 | Shah |
| 5,682,329 | A | 10/1997 | Seem et al. |
| 5,769,315 | A | 6/1998 | Drees |
| 5,791,408 | A | 8/1998 | Seem |
| 5,867,384 | A | 2/1999 | Drees et al. |
| 6,006,142 | A | 12/1999 | Seem et al. |
| 6,098,010 | A | 8/2000 | Krener et al. |
| 6,118,186 | A | 9/2000 | Scott et al. |
| 6,122,605 | A | 9/2000 | Drees et al. |
| 6,161,764 | A | 12/2000 | Jatnieks |
| 6,219,590 | B1 | 4/2001 | Bernaden, III et al. |
| 6,223,544 | B1 | 5/2001 | Seem |
| 6,265,843 | B1 | 7/2001 | West et al. |
| 6,269,650 | B1 | 8/2001 | Shaw |
| 6,296,193 | B1 | 10/2001 | West et al. |
| 6,369,716 | B1 | 4/2002 | Abbas et al. |
| 6,389,331 | B1 | 5/2002 | Jensen et al. |
| 6,408,228 | B1 | 6/2002 | Seem et al. |
| 6,415,617 | B1 | 7/2002 | Seem |
| 6,477,439 | B1 | 11/2002 | Bernaden, III et al. |
| 6,594,554 | B1 | 7/2003 | Seem et al. |
| 6,816,811 | B2 | 11/2004 | Seem |
| 6,862,540 | B1 | 3/2005 | Welch et al. |
| 6,937,909 | B2 | 8/2005 | Seem |
| 6,973,793 | B2 | 12/2005 | Douglas et al. |
| 7,031,880 | B1 | 4/2006 | Seem et al. |
| 7,113,890 | B2 | 9/2006 | Frerichs et al. |
| 7,124,637 | B2 | 10/2006 | Singhal et al. |
| 7,434,413 | B2 | 10/2008 | Wruck |
| 7,578,734 | B2 | 8/2009 | Ahmed et al. |
| 7,685,830 | B2 | 3/2010 | Thybo et al. |
| 2004/0164690 | A1 | 8/2004 | Degner et al. |
| 2005/0006488 | A1 | 1/2005 | Stanimirovic |
| 2005/0040250 | A1 | 2/2005 | Wruck |
| 2006/0090467 | A1 | 5/2006 | Crow |
| 2006/0259285 | A1 | 11/2006 | Bahel et al. |
| 2007/0023533 | A1 | 2/2007 | Liu |
| 2007/0191967 | A1 | 8/2007 | Yo et al. |
| 2008/0097651 | A1 | 4/2008 | Shah et al. |
| 2008/0179408 | A1 | 7/2008 | Seem |
| 2008/0179409 | A1 | 7/2008 | Seem |
| 2008/0277486 | A1 | 11/2008 | Seem et al. |
| 2009/0001179 | A1 | 1/2009 | Dempsey |
| 2009/0099698 | A1 | 4/2009 | Masui et al. |
| 2009/0308941 | A1 | 12/2009 | Patch |
| 2010/0082161 | A1 | 4/2010 | Patch |
| 2010/0106328 | A1 | 4/2010 | Li et al. |
| 2010/0106331 | A1 | 4/2010 | Li et al. |

FOREIGN PATENT DOCUMENTS

| | | | |
|---|---|---|---|
| JP | 04-062352 A | | 2/1992 |
| JP | 10-047738 A | | 2/1998 |
| SU | 535103 A | | 11/1976 |
| WO | WO 00/68744 A1 | | 11/2000 |
| WO | WO 2009/012269 A2 | | 1/2009 |
| WO | WO 2009/012282 A2 | | 1/2009 |

OTHER PUBLICATIONS

Adetola et al., Adaptive Extremum-Seeking Receding Horizon Control of Nonlinear Systems, American Control Conference Proceedings, 2004, pp. 2937-2942.

Adetola et al., Adaptive Output Feedback Extremum Seeking Receding Horizon Control of Linear Systems, ScienceDirect, Elsevier, Journal of Process Control, vol. 16, 2006, pp. 521-533.

Adetola et al., Parameter Convergence in Adaptive Extremum-Seeking Control, ScienceDirect, Elsevier, Automatica, vol. 43, available online Sep. 28, 2006, pp. 105-110.

Ariyur et al., Analysis and Design of Multivariable Extremum Seeking, Proceedings of the American Control Conference, May 8-10, 2002, Anchorage, Alaska, pp. 2903-2908.

Ariyur et al., Multivariable Extremum Seeking Feedback: Analysis and Design, 2002, pp. 1-15.

Ariyur et al., Real Time Optimization by Extremum Seeking Control, John Wiley & Sons, Oct. 2003.

Ariyur et al., Slope Seeking and Application to Compressor Instability Control, Proceedings of the 41st IEEE Conference on Decision and Control, Dec. 2002, Las Vegas, Nevada, pp. 3690-3697.

Ariyur et al., Slope Seeking: A Generalization of Extremum Seeking, International Journal of Adaptive Control and Signal Processing, vol. 18, 2004, pp. 1-22.

Astrom et al., Optimalizing Control, Adaptive Control Second Edition Addison-Wesley Publishing Company, 1995, pp. 214-230.

Banaszuk et al., Adaptive Control of Combustion Instability Using Extremum-Seeking, Proceedings of the American Control Conference, Jun. 2000, Chicago, Illinois, pp. 416-422.

Banavar et al., Functional Feedback in an Extremum Seeking Loop, Proceedings of the 40th IEEE Conference on Decision and Control, Dec. 2001, Orlando, Florida, pp. 1316-1321.

Banavar, R.N., Extremum Seeking Loops with Quadratic Functions: Estimation and Control, International Journal of Control, vol. 76, No. 14, 2003, pp. 1475-1482.

Beaudoin et al., Bluff-Body Drag Reduction by Extremum-Seeking Control, Journal of Fluids and Structures, vol. 22, 2006, pp. 973-978.

Binetti et al., Control of Formation Flight via Extremum Seeking, Proceedings of the American Control Conference, May 8-10, 2002, Anchorage, Alaska, pp. 2848-2853.

Blackman, P.F., Extremum-Seeking Regulators, an Exposition of Adaptive Control, Pergamon Press, 1962.

Cowan, Review of Recent Commercial Roof Top Unit Field Studies in the Pacific Northwest and California, report for Northwest Power and Conservation Council and Regional Technical Forum, Oct. 8, 2004, 18 pages.

DOE Federal Emergency Management Program, Actions You Can Take to Reduce Cooling Costs, taken from http://www1.eere.energy.gov/femp/pdfs/om_cooling.pdf, believed to be available May 2005, 8 pages.

Drakunov et al., ABS Control Using Optimum Search via Sliding Modes, IEEE Transactions on Control Systems Technology, vol. 3, No. 1, Mar. 1995, pp. 79-85.

Financial Times Energy, Inc. Economizers, Energy Design Resources, taken from http://www.energydesignresources.com/resource/28/, believed to be available by at least Jan. 2007, 30 pages.

Guay et al., Adaptive Extremum Seeking Control of Nonlinear Dynamic Systems with Parametric Uncertainities, ScienceDiet, Pergamon, Automatica, 2003, pp. 1283-1293.

International Search Report and Written Opinion for International Patent Application No. PCT/US2008/070091, mailed Sep. 30, 2009, 13 pages.

International Search Report and Written Opinion for International Patent Application No. PCT/US2008/070118, mailed Oct. 19, 2009, 11 pages.

Killingsworth et al., PID Turning Using Extremum Seeking, IEEE Control Systems Magazine, Feb. 2006, pp. 70-79.

Krstic et al., Stability of Extremum Seeking Feedback for General Nonlinear Dynamic Systems, Automatica, vol. 36, Mar. 1997, pp. 595-601.

Krstic, Miroslav, Extremum Seeking Control for Discrete-Time Systems; IEEE Transactions on Automatic Control, University of California Postprints, 2002, pp. 318-323.

Krstic, Miroslav, Performance Improvement and Limitations in Extremum Seeking Control Department of Mechanical and Aerospace Engineering, University of California, San Diego, La Jolla, California, Dec. 1998, pp. 313-326.

Larsson, Stefan, Literature Study on Extremum Control, Control and Automation Laboratory, Department of Signals and Systems, Chalmers University of Technology, Nov. 2001, pp. 1-14.

Leblanc, M. Sur l'electrification des Chemins de fer au Moyen de Courants Alternatifs de Frequence Elevee, Revue Generale de l'Electricite, 1922.

Leyva et al., MPPT of Photovoltaic Systems Using Extremum-Seeking Control, IEEE Transactions on Aerospace and Electronic Systems, vol. 42, No. 1, Jan. 2006, pp. 249-258.

Li et al., Extremum Seeking Control of a Tunable Thermoacoustic Cooler, IEEE Transactions on Control Systems Technology, vol. 13, No. 4, Jul. 2005, pp. 527-536.

Liu et al., Extremum-Seeking with Variable Gain Control for Intensifying Biogas Production in Anaerobic Fermentation, Water Science & Technology, vol. 53, No. 4-5, 2006, pp. 35-44.

Marcos et al., Adaptive Extremum-Seeking Control of a Continuous Stirred Tank Bioreactor with Haldane's Kinetics, Journal of Process Control, vol. 14, 2004, pp. 317-328.

Notice of Allowance for U.S. Appl. No. 11/699,860, dated Aug. 23, 2010, 6 pages.

Office Action for U.S. Appl. No. 11/699,860, dated Aug. 20, 2009, 18 pages.

Office Action for U.S. Appl. No. 11/699,859, dated Mar. 15, 2010, 12 pages.

Office Action for U.S. Appl. No. 11/699,860 dated Jun. 9, 2010, 9 pages.

Office Action for U.S. Appl. No. 11/699,859, dated Aug. 31, 2010, 6 pages.

Pan et al., Discrete-Time Extremum Seeking Algorithms, Proceedings of American Control Conference, Anchorage, Alaska, May 2002, pp. 3753-3758.

Popovic et al., Extremum Seeking Methods for Optimzation of Variable Cam Timing Engine Operation, Proceedings of the American Control Conference, Jun. 4-6, 2003, Denver, Colorado, pp. 3136-3141.

Rotea, Analysis of Multivariable Extremum Seeking Algorithms, Proceedings of the American Control Conference, Jun. 2000, Chicago, Illinois, pp. 433-437.

Salsbury, A Controller for HVAC Systems with Embedded Fault Detection Capabilities Based on Simulation Models, presented at the International Building Simulation Conference in Kyoto, Japan, Sep. 1999, 8 pages.

Sane et al., Building HVAC Control Systems—Role of Controls and Optimization, Proceedings of the American Control Conference, Jun. 14-16, 2006, Minneapolis, Minnesota, 6 pages.

Speyer et al., Extremum Seeking Loops with Assumed Functions, Proceedings of the 39th IEEE Conference on Decision and Control, Dec. 2000, Sydney, Australia, pp. 142-147.

Sternby, Extremum Control Systems—An Area for Adaptive Control?, Joint Automatic Control Conference, San Francisco, California, Aug. 13-15, 1980, 12 pages.

Teel et al., Solving Smooth and Nonsmooth Multivariable Extremum Seeking Problems by the Methods of Nonlinear Programming, Proceedings of American Control Conference, Jun. 2001, Arlington, Virginia, pp. 2394-2399.

Teel, A.R., Lyapunov Methods in Nonsmooth Optimization, Part I: Quasi-Newton Algorithms for Lipschitz, Regular Functions, Proceedings of the 39th IEEE Conference on Decision and Control, Dec. 2000, Sydney, Australia, pp. 112-117.

Teel, A.R., Lyapunov Methods in Nonsmooth Optimization, Part II: Persistently Exciting Finite Differences, Proceedings of the 39th IEEE Conference on Decision and Control, Dec. 2000, Sydney, Australia, pp. 118-123.

Titica et al., Adaptive Extremum Seeking Control of Fed-Batch Bioreactors, European Journal of Control, 2003, pp. 618-631.

Tsien, H.S., Engineering Cybernetics, McGraw-Hill Book Company, Inc., 1954.

Tunay, I., Antiskid Control for Aircraft via Etremum-Seeking, Proceedings of American Control Conference, Jun. 2001, Arlington, Virginia, pp. 665-670.

Walsh, On the Application of Multi-Parameter Extremum Seeking Control, Proceedings of the American Control Conference, Jun. 2000, Chicago, Illinois, pp. 411-415.

Wang et al., Experimental Application of Extremum Seeking on an Axial-Flow Compressor, IEEE Transactions on Control Systems Technology, vol. 8, No. 2, Mar. 2000, pp. 300-309.

Wang et al., Extremum Seeking for Limit Cycle Minimization, IEEE Transactions on Automatic Control, vol. 45, No. 12, Dec. 2000, pp. 2432-2437.

Wang et al., Optimizing Bioreactors by Extremum Seeking, International Journal of Adaptive Control and Signal Processing, 1999, pp. 651-669.

Yu et al., Extremum-Seeking Control Strategy for ABS System with Time Delay, Proceedings of American Control Conference, May 2002, Anchorage, Alaska, pp. 3753-3758.

Yu et al., Extremum-Seeking Control via Sliding Mode with Periodic Search Signals, Proceedings of the 41st IEEE Conference on Decision and Control, Dec. 2002, Las Vegas, Nevada, pp. 323-328.

Zhang et al., Extremum-Seeking Nonlinear Controllers for a Human Exercise Machine, IEEE/ASME Transactions on Mechatronics, vol. 11, No. 2, Apr. 2006, pp. 233-240.

Zhang, Y., Stability and Performance Tradeoff with Discrete Time Triangular Search Minimum Seeking, Proceedings of American Control Conference, Jun. 2000, Chicago, Illinois, pp. 423-427.

Examination Report for G.B. Patent Application No. 1000634.4, mailed Aug. 30, 2011, 2 pages.

Office Action for U.S. Appl. No. 12/650,366, dated Oct. 20, 2011, 18 pages.

ADAPTIVE REAL-TIME OPTIMIZATION CONTROL

CROSS-REFERENCE TO RELATED PATENT APPLICATIONS

This application is a continuation of U.S. application Ser. No. 11/699,860, filed Jan. 30, 2007, incorporated herein by reference in its entirety.

BACKGROUND

The present application relates to handling units of a heating, ventilation and air conditioning system, and more particularly to regulating the amount of outdoor air that is introduced into the system in order to reduce the amount of mechanical heating and cooling required.

FIG. 2 conceptually illustrates a single duct air-handling unit (AHU) 10 of a heating, ventilation and air conditioning (HVAC) system which controls the environment of a room 12 in a building. Air from room 12 is drawn into a return duct 14 from which some of the air flows through a return damper 16 to a supply duct 18. Some of the return air may be exhausted outside the building through an outlet damper 20 and replenished by fresh outdoor air entering through an inlet damper 22. A minimum amount of fresh outdoor air entering the system for proper ventilation within the building is typically required by building codes. The dampers 16, 20, and 22 are opened and closed by actuators which are operated by a controller 24 to control the ratio of return air to fresh outdoor air. The mixture of return air and fresh outdoor air is forced by a fan 25 through a cooling coil 26 and a heating coil 28 before being fed into room 12.

Controller 24 also operates a pair of valves 27 and 29 that regulate the flow of chilled fluid through the cooling coil 26 and the flow of heated fluid through the heating coil 28, depending upon whether the circulating air needs to be cooled or heated. These coils 26 and 28 provide "mechanical" heating and cooling of the air and are referred to herein as "mechanical temperature control elements." The amount of cooling or heating energy that is required to be provided by mechanical temperature control elements is referred to herein as a "mechanical load" of the HVAC system.

Sensors 30 and 32, respectively, measure the temperature and humidity of the outdoor air and provide signals to controller 24. Another pair of sensors 34 and 36, respectively, measure the temperature and humidity of the air in return duct 14. Additional temperature sensors 38 and 39 are located in the outlet of supply duct 18 and in room 12.

Controller 24 executes a software program that implements an air side economizer function that uses outdoor air to reduce the mechanical cooling requirements for air-handling unit 10. There are three air side economizer control strategies that are in common use: temperature, enthalpy, and temperature and enthalpy. These strategies control transitions between two air circulation modes: minimum outdoor air with mechanical cooling and maximum outdoor air with mechanical cooling.

In temperature economizer control, an outdoor air temperature is compared to the return temperature or to a switch-over threshold temperature. If mechanical cooling is required and the outdoor air temperature is greater than the return air temperature or the switch-over threshold temperature, then a minimum amount of outdoor air required for ventilation (e.g. 20% of room supply air) enters air-handling unit 10. If mechanical cooling is required and the outdoor air temperature is less than the return temperature or a switch over threshold temperature, then a maximum amount of outdoor air (e.g. 100%) enters the air-handling unit 10. In this case, the outlet damper 20 and inlet damper 22 are opened fully while return damper 16 is closed.

With enthalpy economizer control, the outdoor air enthalpy is compared with the return air enthalpy. If mechanical cooling is required and the outdoor air enthalpy is greater than the return air enthalpy, then the minimum amount of outdoor air required for ventilation enters the air-handling unit. Alternatively, when mechanical cooling is required and the outdoor air enthalpy is less than the return air enthalpy, then the maximum amount of outdoor air enters air-handling unit 10.

With the combined temperature and economizer control strategy, when mechanical cooling is required and the outdoor temperature is greater than the return temperature or the outdoor enthalpy is greater than the return enthalpy, the minimum amount of outdoor air required for ventilation is used. If mechanical cooling is required and the outdoor temperature is less than the return air temperature and the outdoor enthalpy is less than the return enthalpy, then the maximum amount of outdoor air enters air-handling unit 10. The parameters of either strategy that uses enthalpy have to be adjusted to take into account different geographic regions of the country.

There are a number of different processes that can be used to regulate dampers 16, 20, and 22 to control the fraction of outdoor air, such as a direct airflow measurement method or an energy and mass balance method.

The direct airflow measurement method requires sensors that measure airflow rate, which enables the fraction of outdoor air in the supply air to be controlled with a feedback controller. Krarti, "Experimental Analysis of Measurement and Control Techniques of Outdoor Air Intake Rates in VAV Systems," *ASHRAE Transactions*, Volume 106, Part 2, 2000, describes several well-known methods for directly measuring the outdoor air fraction.

Alternatively, the fraction of outdoor air in the room supply air can be determined by performing energy and mass balances. Drees, "Ventilation Airflow Measurement for ASHRAE Standard 62-1989," *ASHRAE Journal*, October, 1992; Hays et al., "*Indoor Air Quality Solutions and Strategies*," Mc-Graw Hill, Inc., pages 200-201, 1995; and Krarti (supra), describe methods for determining the fraction of outdoor air in the supply air based on a concentration balance for carbon dioxide. The fraction of outdoor air in the supply air is determined from the expression:

$$f_{oa} = \frac{C_{ra} - C_{sa}}{C_{ra} - C_{oa}}$$

where $f_{oa}$ is the outdoor air fraction, $C_{ra}$ is the carbon dioxide concentration of the return air, $C_{sa}$ is the carbon dioxide concentration of the supply air, and $C_{oa}$ is the carbon dioxide concentration of the outdoor air.

Performing mass balances on the water vapor and air entering and leaving the room gives:

$$f_{oa} = \frac{\omega_{ra} - \omega_{ma}}{\omega_{ra} - \omega_{oa}}$$

where $\omega_{ra}$ is the humidity ratio of the return air, $\omega_{ma}$ is the humidity ratio of the mixed air, and $\omega_{oa}$ is the humidity ratio of the outdoor air.

Performing an energy and mass balance on the air entering and leaving the room gives:

$$f_{oa} = \frac{h_{ra} - h_{ma}}{h_{ra} - h_{oa}}$$

where $h_{ra}$ is the enthalpy of the return air, $h_{ma}$ is the enthalpy of the mixed air, and $h_{oa}$ is the enthalpy of the outdoor air.

Assuming constant specific heats for the return air, mixed air, and outdoor air yields:

$$f_{oa} = \frac{T_{ra} - T_{ma}}{T_{ra} - T_{oa}}$$

Alternatively, an estimate of the fraction of outdoor air in the supply air can be determined from a model of the airflow in the air-handling unit, as described by Seem et al., in "A Damper Control System for Preventing Reverse Airflow Through The Exhaust Air Damper of Variable-Air-Volume Air-Handling Units," *International Journal of Heating, Ventilating, Air-Conditioning and Refrigerating Research*, Volume 6, Number 2, pp. 135-148, April 2000, which reviews equations for modeling the airflow in air-handling unit 10. See also U.S. Pat. No. 5,791,408. The descriptions in both documents are incorporated herein by reference. The desired damper position can be determined based on the desired fraction of outdoor air and the airflow model.

One-dimensional optimization is applied to the fraction of outdoor air in the supply air to determine the optimal fraction which provides the minimal mechanical cooling load. Any of several well-known optimization techniques may be employed, such as the ones described by Richard P. Brent in "*Algorithms for Minimization without Derivatives*," Prentice-Hall Inc., Englewood Cliffs, N.J., 1973, or Forsythe, Malcolm, and Moler in "*Computer Methods for Mathematical Computations*," Prentice Hall, Englewood Cliffs, N.J., 1977. Alternatively, the "fminband" function contained in the Matlab software package available from The Mathworks, Inc., Natick Mass. 01760 U.S.A., may be used to find the optimal fraction of outdoor air.

These control strategies have assumed that the reference value or system optimal performance level was given. The reference value is typically determined by a sensor. The reference value or optimal operating conditions for a HVAC system is difficult to determine under various dynamic parameters. One problem with economizer control is the accuracy of the sensors. Humidity sensing elements can be inaccurate and unstable, which causes the economizer cycle to operate inefficiently. It would be advantageous to provide an alternative control system that minimized the need for sensors. Further, it would be advantageous to provide an alternative control strategy where the reference value is unknown. It would also be advantageous to provide a system that uses an extremum seeking controller to enhance system performance.

SUMMARY

One embodiment relates to a system and method, which regulates an amount of outdoor air that is introduced into a building and operates a mechanical temperature control device that varies temperature in the building. The system and method monitors a heating control signal, a damper control signal, a cooling control signal and an outdoor air temperature in a first state. The system and method performs a state comparison of the heating control signal, the damper signal, the cooling signal and the outdoor air temperature to a predetermined range of values and transitions into a second state based on the second comparison.

Another embodiment relates to a system and method, which regulates an amount of outdoor air that is introduced into a building and operates a mechanical temperature control device that varies temperature in the building. The system and method monitors a heating control signal, a damper control signal, a cooling control signal, an outdoor air temperature and an outdoor air humidity in a first state. The system and method computes an outdoor air enthalpy, a state a enthalpy, a state b enthalpy, an outdoor air specific volume, a state b specific volume and a state a temperature. The system and method performs a state comparison of the heating control signal, the damper signal, the cooling signal, the outdoor air temperature, the outdoor air enthalpy, the state a enthalpy, the state b enthalpy, the outdoor air specific volume, the state b specific volume and the state a temperature to a predetermined range of values and transitions into a second state based on the second comparison.

Yet another embodiment relates to a space conditioning device including an air-handling unit. The air-handling unit is coupled to a means for cooling an air and a means for heating an air. The space conditioning device includes a means for controlling the space conditioning device and at least one means for controlling a flow of the air coupled to the means for controlling the space conditioning device and the air-handling unit. The means for controlling the space conditioning device is configured to control the at least one means for controlling the flow of the air utilizing extremum logic

DETAILED DESCRIPTION OF THE EXEMPLARY EMBODIMENTS

Before beginning the detailed description of exemplary embodiments, several general comments are warranted about the applicability and the scope of the present invention.

Although the description below contains many specificities, these specificities are utilized to illustrate some of the preferred embodiments of this invention and should not be construed as limiting the scope of the invention. The scope of this invention should be determined by the claims, their legal equivalents and the fact that it fully encompasses other embodiments, which may become apparent to those skilled in the art. A method or device does not have to address each and every problem to be encompassed by the present invention. All structural, chemical, and functional equivalents to the elements of the below-described invention that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component, or method step in the present disclosure is intended to be dedicated to the public, regardless of whether the element, component, or method step is explicitly recited in the claims.

Figure 1:
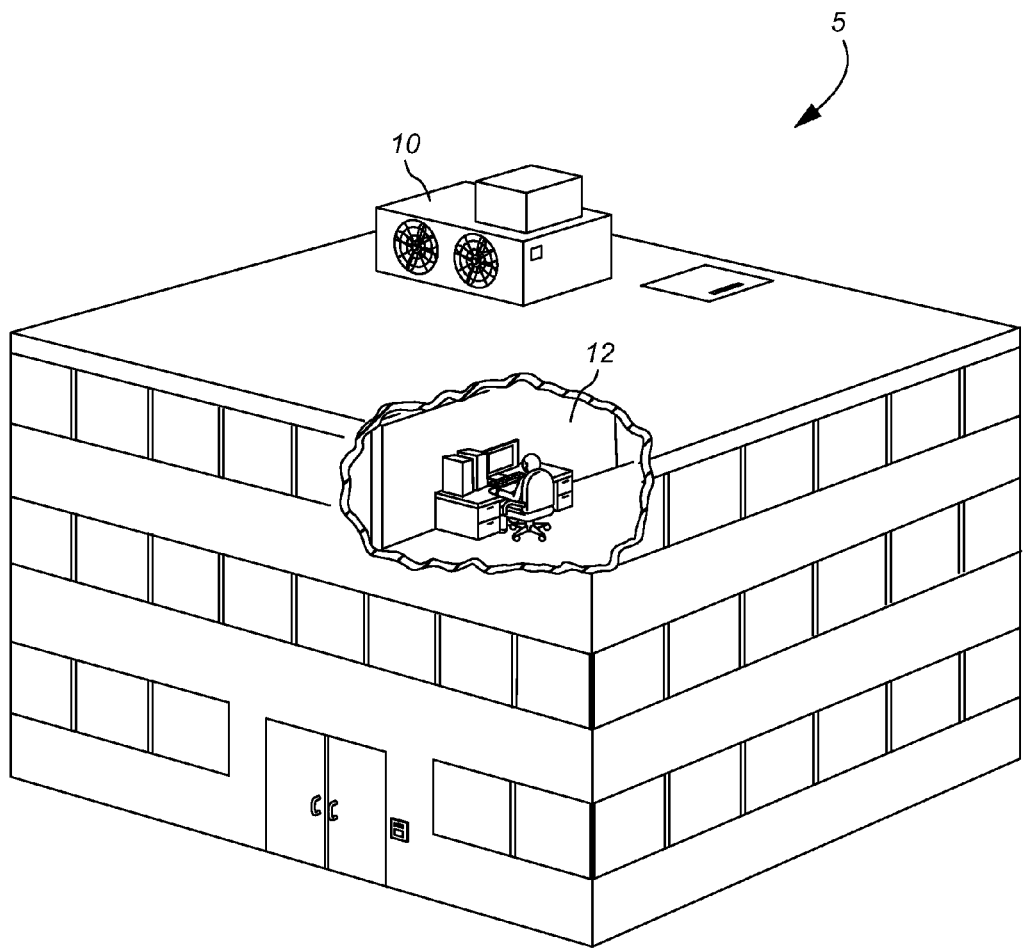
FIG. 1 is an isometric view of a building according to an exemplary embodiment with an HVAC system including an air handling unit.

FIG. 1 shows a building 5 with an air-handling unit 10 according to an exemplary embodiment. Air handling unit 10 is part of a heating, ventilation and air conditioning (HVAC) system which controls the environment of a room 12 in a building 5.

Figure 2:
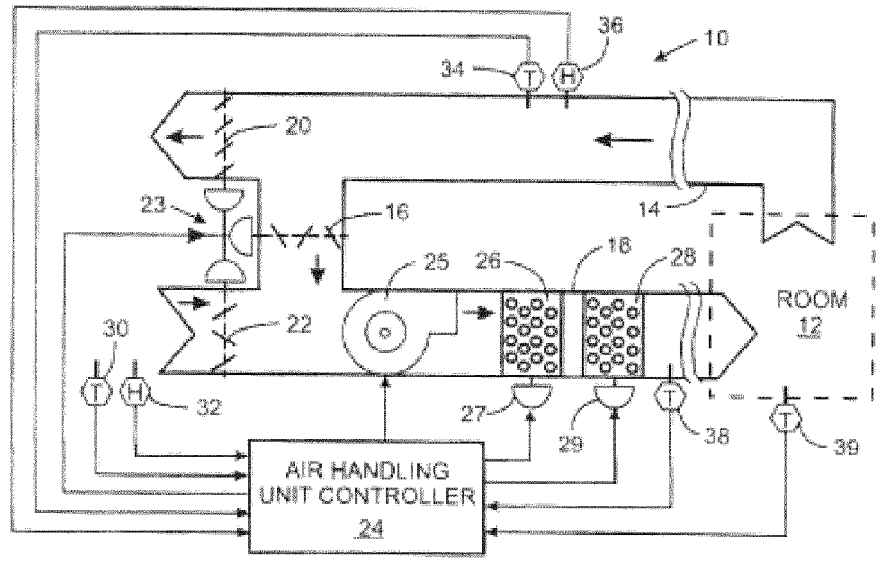
FIG. 2 is a diagram of an air-handling unit in a HVAC system, according to an exemplary embodiment.
Figure 4:
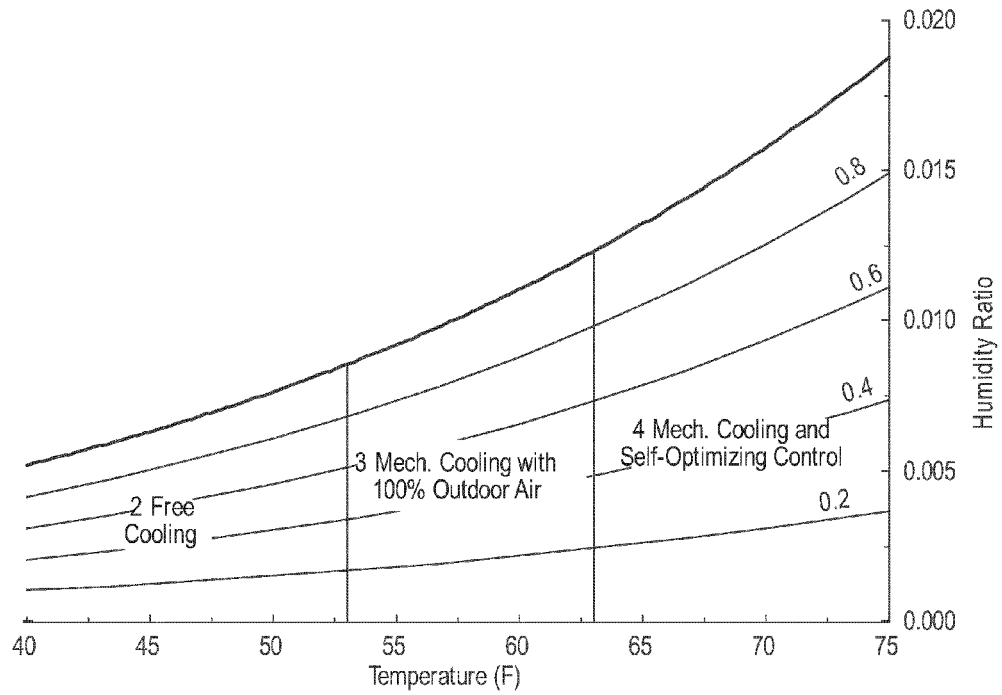
FIG. 4 is an exemplary psychometric chart depicting operation of the four states in FIG. 3 for a specific set of environmental conditions, according to an exemplary embodiment.
Figure 3:
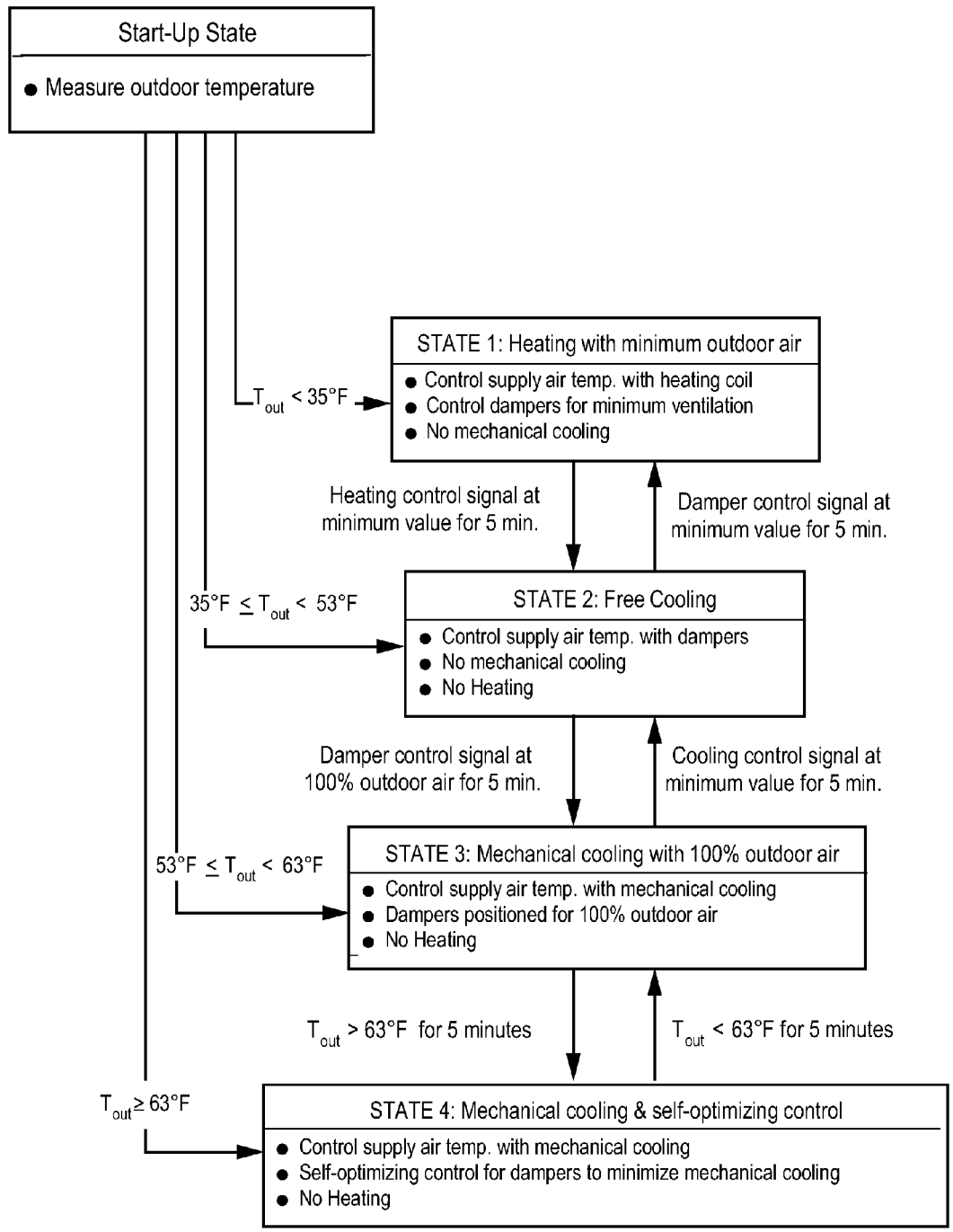
FIG. 3 is a state diagram of a finite state machine with four operating states that are implemented in the controller of the air-handling unit in FIG. 1, according to an exemplary embodiment.

FIG. 2 shows air-handling unit controller 24, which utilizes software to control the air flow rate. In an exemplary embodiment, the software configures the controller as a finite state machine that has four states depicted in FIG. 3. In FIG. 3, a state diagram for controlling an air side economizer for air-handling unit 10 with only an outdoor air-temperature sensor for controlling the air side economizer is shown.

A transition occurs from one state to another state, as indicated by the arrows, when a specified condition or set of conditions occurs. In an exemplary embodiment, the operational data of the air-handling unit is checked when the controller is in a given state to determine whether a defined transition condition exists. A number of the transition conditions are specified in terms of the control being "saturated" in the present state. The term saturated may be a specific time interval, temperature condition, supply air condition and/or return air condition. In an exemplary embodiment, saturation occurs when controller 24 remains in a given operating mode for a predetermined period of time without being able to adequately control the environment of the building. For example, saturation occurs in a mechanical cooling mode when the system is unable to cool the room to the desired temperature within a reasonable amount of time.

In State 1, valve 29 for heating coil 28 is controlled to modulate the flow of hot water, steam, or electricity to the heating coil, thereby controlling the amount of energy transferred to the air. In a large air-handling system with a supply air temperature sensor, the supply air temperature is controlled to maintain the setpoint. In a small air-handling system without a supply air temperature sensor, the room temperature is controlled directly to maintain the setpoint. Dampers 16, 20, and 22 are positioned for a minimum flow rate of outdoor air and there is no mechanical cooling, (i.e. chilled water valve 27 is closed). The minimum flow rate of outdoor air is the least amount required for satisfactory ventilation in the room, for example 20% of the air supplied to the room is outdoor air. The condition for a transition to State 2 is defined by the heating control signal being saturated in the "No Heat Mode." In an exemplary embodiment, the saturation may occur when valve 29 of heating coil 28 remains closed for a defined period of time (i.e. heating of the supply air is not required during that period). This transition condition can result from the outdoor temperature rising to a point at which the interior of the room does not need mechanical heating.

In an exemplary embodiment for State 2, dampers 16, 20, and 22 alone are used to control the supply air temperature in supply duct 18 (i.e. no mechanical heating or cooling). In this State, the amount of outdoor air that is mixed with the return air from the room is regulated to heat or cool the air being supplied to room 12. Because there is no heating or mechanical cooling, the inability to achieve the setpoint temperature results in a transition to either State 1 or 3. In an exemplary embodiment, a transition occurs to State 1 for mechanical heating when either: (i) for a defined period of time the flow of outdoor air is less than that required for proper ventilation or (ii) the outdoor air inlet damper 22 remains in the minimum open position for a given period of time. In an exemplary embodiment, the finite state machine makes a transition from State 2 to State 3 for mechanical cooling upon the damper control being saturated in the maximum outdoor air position (e.g. 100% of the air supplied to the room is outdoor air).

In an exemplary embodiment for State 3, chilled water valve 27 for cooling coil 26 is controlled to modulate the flow of chilled water and control the amount of energy removed from the air. At this time, dampers 16, 20, and 22 are positioned to introduce a maximum amount of outdoor air into AHU 10. There is no heating in this State. In an exemplary embodiment, a transition occurs to State 2 when the mechanical cooling does not occur for the given period of time (i.e. the cooling control is saturated in the no cooling mode).

In the start-up or initial State, the outdoor temperature $T_{out}$ is measured and compared with various thresholds to determine the initial control State. In an exemplary embodiment, the system transitions from the initial control State to one of four States (i.e. State 1 to State 4) based on $T_{out}$. These transitions are detailed in the following four paragraphs.

An exemplary embodiment is shown in FIGS. 2 and 3. When $T_{out}$ is less than 35° F., the system transitions into State 1. In State 1, heating with minimum outdoor air is implemented. State 1 controls the supply air temperature by modulating the amount of heat supplied from heating coils 28. Dampers 16, 20, and 22 are controlled for minimum ventilation. In an exemplary embodiment, a transition to State 2 occurs after the heating control signal has been at its minimum value (no heat position) for five minutes.

In this exemplary embodiment, when $T_{out}$ is less than 53° F. and greater than, or equal to, 35° F., the system transitions to State 2. In State 2, the system is utilizing outdoor air to provide free cooling to the system. State 2 controls the supply air temperature by modulating dampers 16, 20, and 22 to adjust the mixing of outdoor air with return air. In an exemplary embodiment, a transition to State 1 occurs after dampers 16, 20, and 22 have been controlled for minimum ventilation for five minutes. In an exemplary embodiment, a transition to State 3 occurs after dampers 16, 20, and 22 have been controlled to supply 100% outdoor air for five minutes.

In this exemplary embodiment, when $T_{out}$ is less than 63° F. and greater than, or equal to, 53° F., the system transitions to State 3. In State 3, the system provides mechanical cooling with 100% outdoor air. State 3 controls the supply air temperature by modulating the flow rate of chilled water or refrigerant through cooling coil 26. Dampers 16, 20, and 22 are set to allow 100% outdoor air to enter air-handling unit 10. In an exemplary embodiment, a transition to State 2 occurs after the control signal for mechanical cooling has been at a no-cooling value for five minutes. In an exemplary embodiment, a transition to State 4 occurs after the outdoor temperature is greater than, or equal to, 63° F. for five minutes.

In this exemplary embodiment, when $T_{out}$ is greater than or equal to 63° F., the system transitions to State 4. In State 4, mechanical cooling with self-optimizing controls the outdoor air dampers. State 4 controls the supply air temperature by modulating the flow rate of chilled water or refrigerant through cooling coil 26. Self-optimizing control is used to determine dampers' 16, 20, and 22 positions that minimize the amount of mechanical cooling. Ventilation requirements are used to calculate a lower limit on the amount of outdoor air in the supply duct 18. In an exemplary embodiment, a transition to State 3 occurs after the outdoor temperature is less than 63° F. for five minutes.

It should be noted that these threshold temperatures can be varied for geographic locations, client preferences, system configurations, maintenance requirements and/or system designs.

Figure 5:
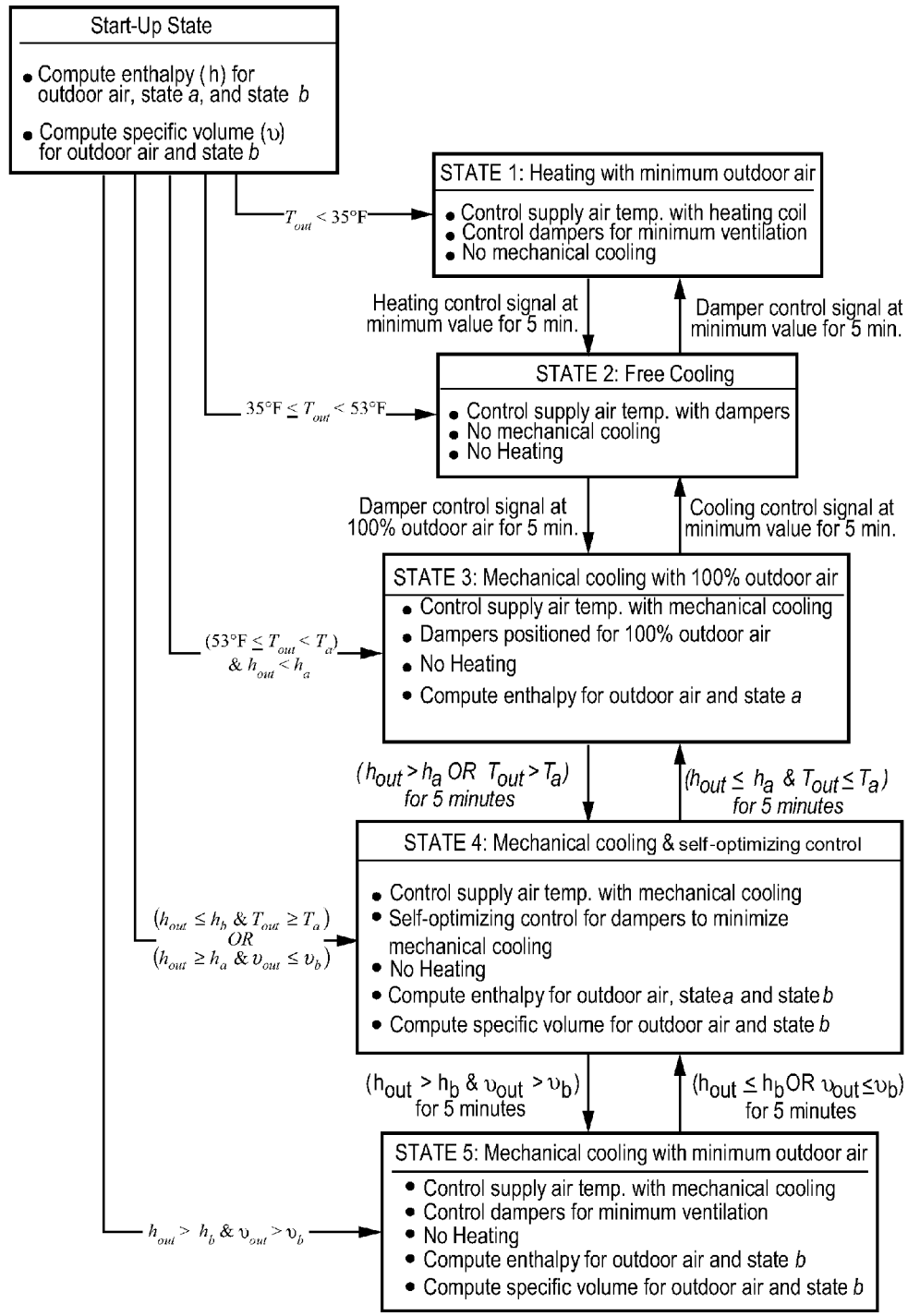
FIG. 5 is a state diagram of a finite state machine with five operating states that are implemented in the controller of the air-handling unit in FIG. 2, according to an exemplary embodiment.

In another exemplary embodiment, the software configures controller 24 as a finite state machine that has five states depicted in FIG. 5. In FIG. 5, a state diagram for controlling air side economizer for air-handling unit 10 with return air, outdoor air temperature and relative humidity sensors is shown. In the initial state, the outdoor temperature $T_{out}$ and relative humidity $\phi_{out}$ are measured. Standard thermodynamic procedures are used to calculate the enthalpy $h_{out}$ and specific volume $\upsilon_{out}$ of outdoor air from the temperature and relative humidity measurements. The return air conditions $T_r$ and estimates of the temperature $T_{error}$ and relative humidity $\phi_{error}$ error sensor errors are used to calculate two new thermodynamic States (State a and b) as follows:

$T_a = T_r - T_{error}$ $\phi_a = \phi_r - \phi_{error}$ $T_b = T_r - T_{error}$ $\phi_b = \phi_r - \phi_{error}$ The enthalpies ($h_a$ and $h_b$) for States a and b are determined from the temperature and relative humilities and standard thermodynamic calculations. The specific volume $\upsilon_b$ of State b is also determined. In an exemplary embodiment, the system transitions from the initial control State to one of five states (i.e. State 1 to State 5) based on $T_a$, $T_{out}$, $h_a$, $h_b$, $h_{out}$, $\upsilon_{out}$, and $\upsilon_b$. These transitions are detailed in the following five paragraphs.

Figure 6:
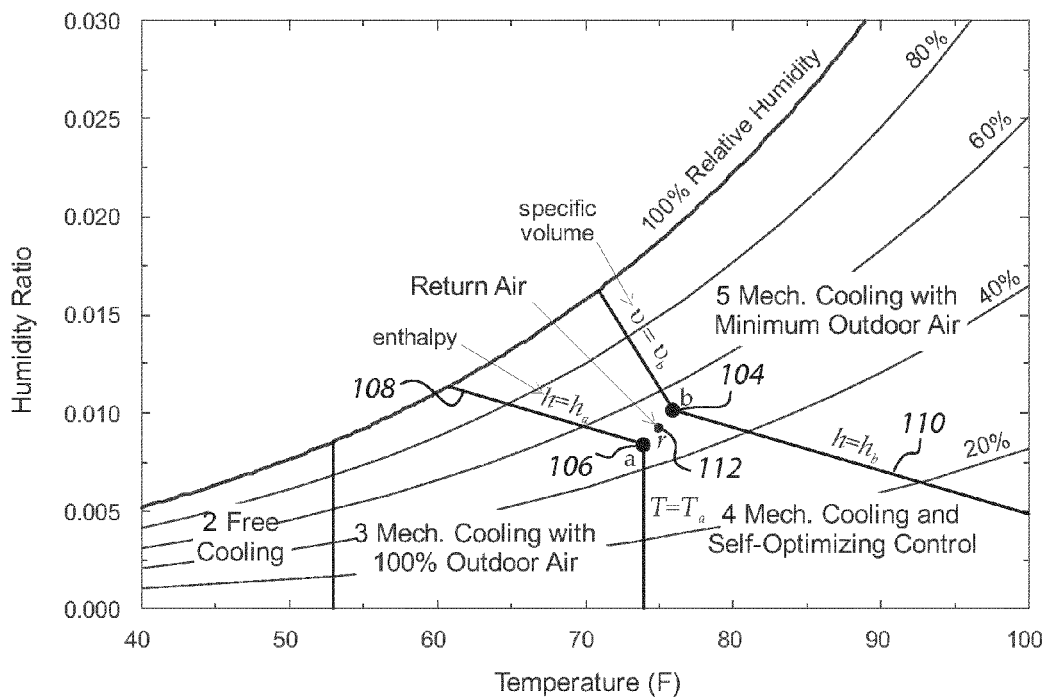
FIG. 6 is an exemplary psychometric chart depicting operation of the five states in FIG. 3 for a specific set of environmental conditions, according to an exemplary embodiment.

An exemplary embodiment is shown in FIGS. 5 and 6. When $T_{out}$ is less than 35° F., the system transitions into State 1. In State 1, heating with minimum outdoor air is implemented. State 1 controls the supply air temperature by modulating the amount of heat supplied from heating coils 28. Dampers 16, 20, and 22 are controlled for minimum ventilation. In an exemplary embodiment, a transition to State 2 occurs after the heating control signal has been at its minimum value (no heat position) for five minutes.

In this exemplary embodiment, when $T_{out}$ is less than 53° F. and greater than, or equal to, 35° F., the system transitions to State 2. In State 2, the system is utilizing outdoor air to provide free cooling to the system. State 2 controls the supply air temperature by modulating dampers 16, 20, and 22 to adjust the mixing of outdoor air with return air. In an exemplary embodiment, a transition to State 1 occurs after dampers 16, 20, and 22 have been at minimum ventilation for five minutes. In an exemplary embodiment, a transition to State 3 occurs after dampers 16, 20, and 22 have been controlled to supply 100% outdoor air for five minutes.

In this exemplary embodiment, when $T_{out}$ is greater than, or equal to, 53° F. and less than, or equal to, $T_a$ while $h_{out}$ is less than $h_a$, the system transitions to State 3. In State 3, the system utilizes mechanical cooling with 100% outdoor air. State 3 controls the supply air temperature by modulating the flow rate of chilled water or refrigerant through cooling coil 26. Dampers 16, 20, and 22 are set to allow 100% outdoor air to enter air-handling unit 10. In an exemplary embodiment, a transition to State 2 occurs after the control signal for mechanical cooling has been at a no-cooling value for five minutes. In an exemplary embodiment, a transition to State 4 occurs if either of the following conditions is true for five minutes: (i) the outdoor enthalpy $h_{out}$ is greater than the enthalpy $h_a$ of State a, or (ii) the outdoor temperature $T_{out}$ is greater than temperature $T_a$ of State a.

In this exemplary embodiment, when $h_{out}$ is less than, or equal to, $h_b$ and $T_{out}$ is greater than, or equal to, $T_a$ or $h_{out}$ is greater than, or equal to, $h_a$ and $\upsilon_{out}$ is less than, or equal to, _98 $_b$, the system transitions to State 4. In State 4, the system utilizes mechanical cooling with self-optimizing control to control dampers 16, 20, and 22. State 4 controls the supply air temperature by modulating the flow rate of chilled water or refrigerant through cooling coil 26. Self-optimizing control is used to determine dampers' 16, 20, and 22 positions that minimizes the amount of mechanical cooling. Outdoor air flow rate lower limit is the minimal ventilation requirement. In an exemplary embodiment, a transition to State 3 occurs after the following two conditions are true for five minutes: (i) outdoor enthalpy $h_{out}$ is less than, or equal to, the enthalpy $h_a$ of State a, and (ii) the outdoor temperature $T_{out}$ is less than, or equal to, the temperature $T_a$ of State a. In an exemplary embodiment, a transition to State 5 occurs after the following two conditions are true for five minutes: (i) outdoor enthalpy $h_{out}$ is greater than the enthalpy $h_b$ of thermodynamic State b, and (ii) the specific volume $\upsilon_{out}$ of outdoor air is greater than the specific volume $\upsilon_b$ of thermodynamic State b.

In this exemplary embodiment, when $h_b$ is less than $h_{out}$ and $\upsilon_b$ is less than $\upsilon_{out}$, the system transitions to State 5. In State 5, the system utilizes mechanical cooling with minimum outdoor air required for ventilation. State 5 controls the supply air temperature by modulating the flow rate of chilled water or refrigerant through cooling coil 26. Dampers 16, 20, and 22 are controlled to provide the minimum outdoor air required for ventilation. In an exemplary embodiment, a transition to State 4 occurs if either of the following conditions is true for five minutes: (i) the enthalpy of the outdoor enthalpy $h_{out}$ is less than, or equal to, the enthalpy $h_b$ of thermodynamic State b, or (ii) the specific volume $\upsilon_{out}$ of outdoor air is less than, or equal to, the specific volume $\upsilon_b$ of thermodynamic State b.

It should be noted that these threshold temperatures, enthalpies and specific volumes can be varied for geographic locations, client preferences, system configurations, maintenance requirements and/or system designs.

Figure 7:
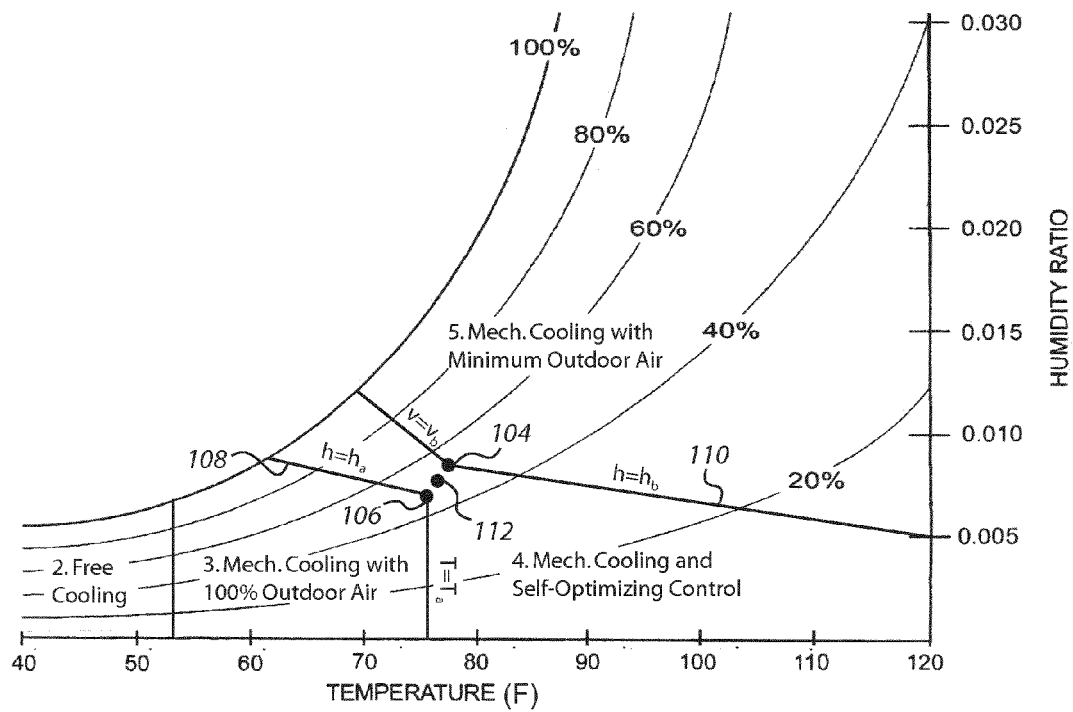
FIG. 7 is an exemplary psychometric chart that shows states of control with return conditions of 75° F. and 50% relative humidity, according to an exemplary embodiment.
Figure 8:
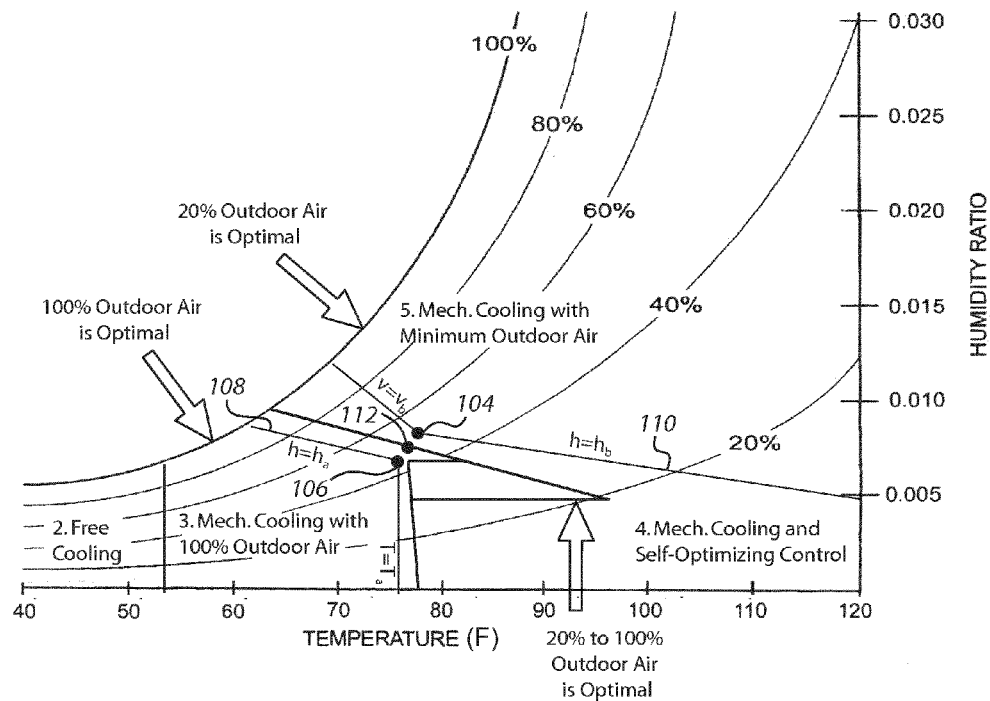
FIG. 8 is an exemplary psychometric chart that shows the regions of optimal control and lines for transitioning between states for a cooling coil model utilizing an ideal coil, according to an exemplary embodiment.

Simulations were performed for an ideal coil and air-handling unit 10 that had a minimum fraction of outdoor air to supply air of 20%, and a return temperature of 75° F. and relative humidity of 50%. FIGS. 6 and 7 shows outdoor air conditions where the self-optimizing control will transition between the following three fractions of outdoor air: (i) 20% outdoor air, (ii) between 20 and 100% outdoor air, and (iii) 100% outdoor air. FIG. 8 shows results for an ideal coil. A person skilled in the art will notice that the optimal regions of control are dependent on the type of coil. In an exemplary embodiment, the regions may be dependent on the return air conditions, setpoint for the supply air temperature, and minimum fraction of outdoor air to supply air required for ventilation.

Figure 9:
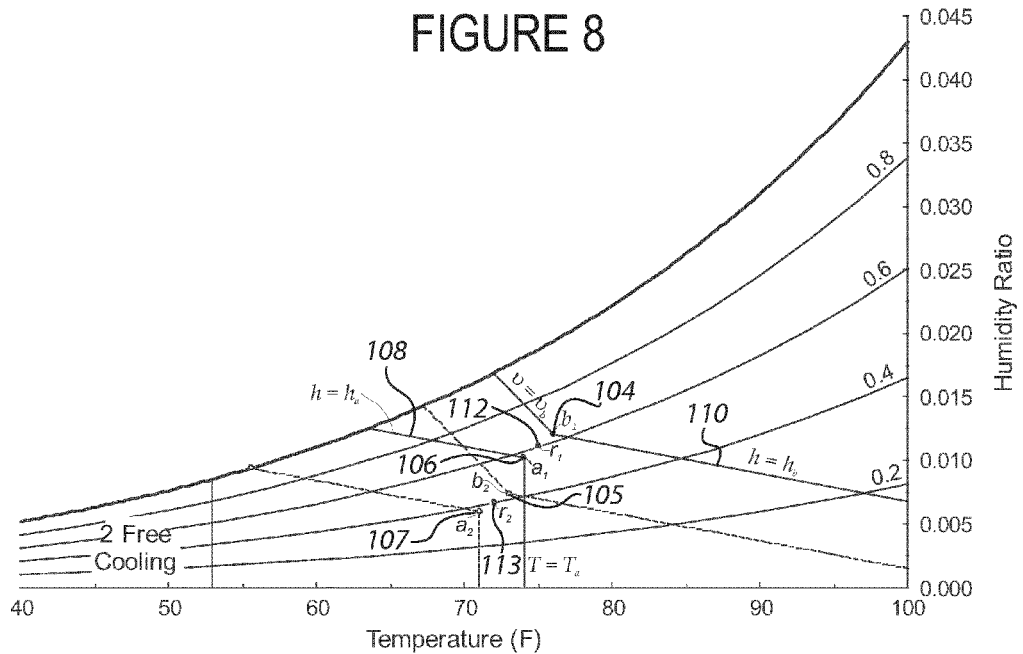
FIG. 9 is an exemplary psychometric chart depicting transition lines for return conditions of 75° F. and 60% relative humidity and 72° F. and 40% relative humidity.

FIG. 9 shows the outdoor air conditions and corresponding control state regions on a psychometric chart for the following two different return conditions: (i) 75° F. and 60% relative humidity, and (ii) 72° F. and 40% relative humidity. The point $r_1$ is for return conditions of 75° F. and 60% relative humidity, and the corresponding thermodynamic states for determining transitions are $a_1$ and $b_1$. The point $r_2$ is for return conditions of 72° F. and 40% relative humidity, and the corresponding thermodynamic states for determining transitions are $a_2$ and $b_2$. FIG. 9 shows how the transition lines between control states moves as the return conditions change from $r_1$ to $r_2$.

Figure 10:
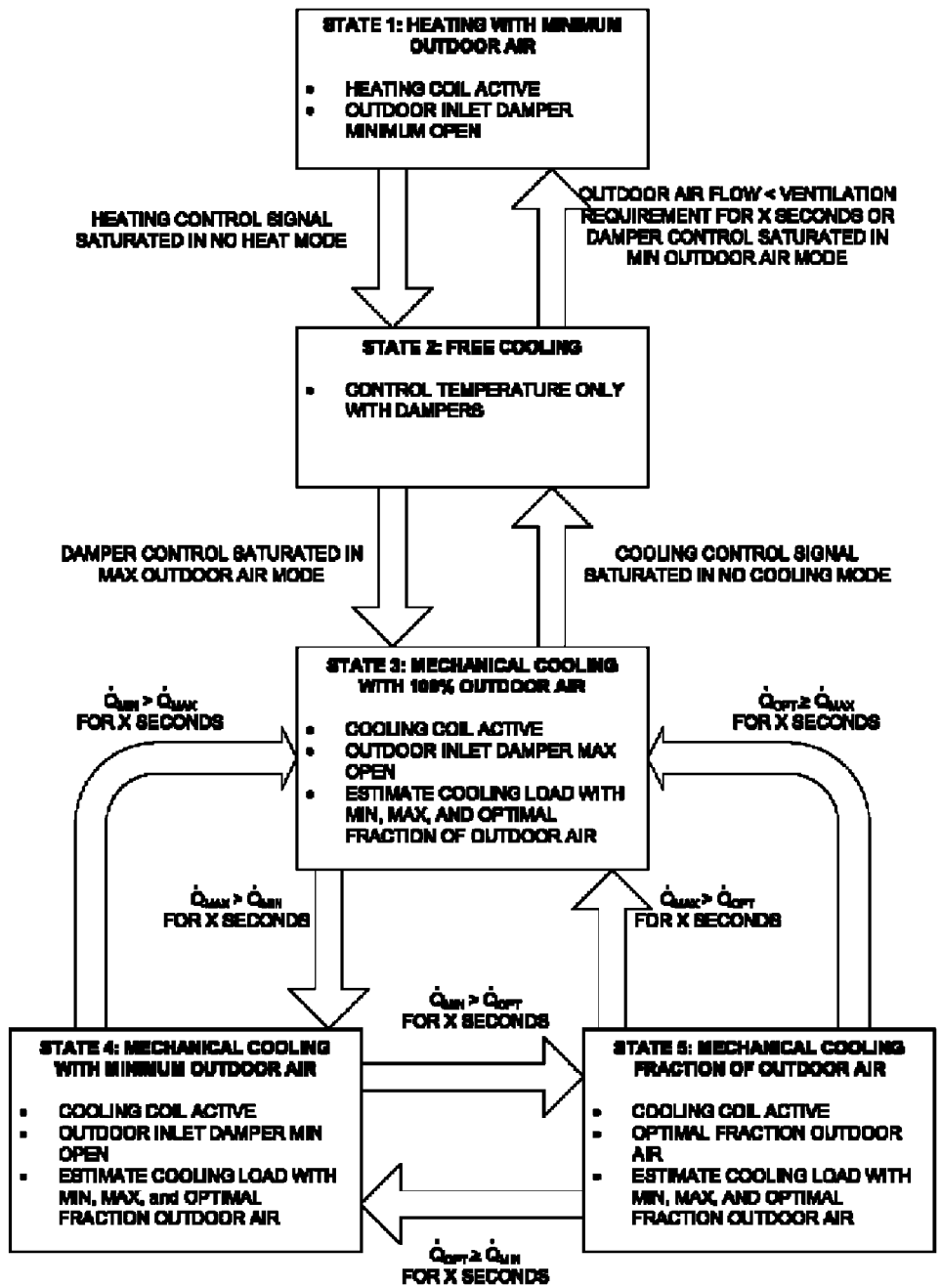
FIG. 10 is another exemplary state diagram of a finite state machine with five operating states that is implemented in the controller of the air-handling unit in FIG. 2, according to an exemplary embodiment.

Referring to FIG. 10, an alternative embodiment five state system is shown. In State 1, valve 29 for heating coil 28 is controlled to modulate the flow of hot water, steam, or electricity to the heating coil, thereby controlling the amount of energy transferred to the air. This maintains the room temperature at the setpoint. Dampers 16, 20, and 22 are positioned for a minimum flow rate of outdoor air and there is no mechanical cooling (i.e. chilled water valve 27 is closed). The minimum flow rate of outdoor air is the least amount required for satisfactory ventilation in the room. For example, 20% of the air supplied to the room is outdoor air. The condition for a transition to State 2 is defined by the heating control signal being saturated in the no heat position. Such saturation occurs when valve 29 of heating coil 28 remains closed for a defined period of time (i.e. heating of the supply air is not required during that period). This transition condition can result from the outdoor temperature rising to a point at which the interior of the room does not need mechanical heating.

In State 2, dampers 16, 20, and 22 alone are used to control the supply air temperature in supply duct 18 (i.e. no mechanical heating or cooling). In State 2 the amount of outdoor air that is mixed with the return air from the room is regulated to heat or cool the air being supplied to room 12. Because there is no heating or mechanical cooling, the inability to achieve the setpoint temperature results in a transition to either State 1 or 3. A transition occurs to State 1 for mechanical heating when either for a defined period of time the flow of outdoor air is less than that required for proper ventilation or outdoor air inlet damper 22 remains in the minimum open position for a given period of time. The finite state machine makes a transition from State 2 to State 3 for mechanical cooling upon the damper control being saturated in the maximum outdoor air position (e.g. 100% of the air supplied to the room is outdoor air).

In State 3, chilled water valve 27 for cooling coil 26 is controlled to modulate the flow of chilled water and control the amount of energy removed from the air. At this time, dampers 16, 20, and 22 are positioned to introduce a maximum amount of outdoor air into AHU 10. There is no heating in this State. A transition occurs to State 2 when the mechanical cooling does not occur for the given period of time (i.e. the cooling control is saturated in the no cooling mode).

Transitions between States 3 and 4 are based on estimates of the load that is exerted on cooling coil 26 when outdoor air flows into AHU 10 at minimum and with maximum flow rates. Thus, in both of those State 3 and State 4 the air-handling controller performs those estimations. The three principal steps involved in the estimation process are: (1) determine the mixed air conditions from the fraction of outdoor air in the room supply air and from the outdoor and return air conditions, (2) determine the desired air temperature after cooling coil 26 from the setpoint temperature and an estimate of the heat gain from fan 25, and (3) estimate the load exerted on the mechanical cooling coil 26. Since States 3 and 4 control cooling of the room air, the particular mechanical temperature control element for which the load is being estimated in cooling coil 26. However, one skilled in the art will appreciate that the present inventive concept may also be employed in heating states where mechanical temperature control element is heating coil 28.

The mixed air humidity ratio $\omega_m$, and enthalpy $h_m$, are determined from the expressions:

$$\omega_m = \frac{\dot{m}_o}{\dot{m}_s} w_o + \left(1 - \frac{\dot{m}_o}{\dot{m}_s}\right)\omega_r$$

$$h_m = \frac{\dot{m}_o}{\dot{m}_s} h_o + \left(1 - \frac{\dot{m}_o}{\dot{m}_s}\right)h_r$$

where $\omega_o$ and $\omega_r$ are the outdoor air and return air humidity ratios, respectively; $m_o$ and $m_s$ are the mass flow rate of the outdoor air and supply air, respectively; and $h_o$ and $h_r$ are the enthalpy of the outdoor air and return air, respectively. Therefore, the term $m_o/m_s$ represents the fraction of outdoor air in the air being supplied to room 12, (i.e. 0.20 or 1.00 for the State machine). The humidity ratios and enthalpy for the outdoor air and return air are determined from temperature and relative humidity measurements provided from sensors 30, 32, 34, and 36 and by psychometric equations provided by the 1997 *ASHRAE Handbook—Fundamentals*, Chapter 6, American Society of Heating, Refrigerating and Air-Conditioning Engineers, 1997; and ASHRAE, *Psychometrics-Theory and Practice*, American Society of Heating, Refrigerating, and Air-Conditioning Engineers, ISBN 1-883413-39-7, Atlanta, Ga., 1996.

The air temperature after cooling coil 26 is determined from the setpoint temperature for the supply air and an estimate of the temperature rise across fan 25 as determined from the equation:

$$T_S - T_C = \frac{P_S - P_C}{\rho c_p \eta_O}$$

where $\rho$ is the air density, $c_p$ is the constant pressure specific heat, $\eta_o$ is the overall efficiency of the components in the duct. $P_S$–$P_C$ equals the pressure rise across the fan, and $T_s$ and $T_c$ are the supply air and chilled air temperature, respectively. The chilled air temperature is the bulk air temperature after cooling coil 26. The overall efficiency can be determined by multiplying the efficiencies of the components in the duct. If the fan, drive, and motor are all in the duct, then the overall efficiency $\eta_o$ is determined from:

$$\eta_O = \eta_{fan} \eta_{drive} \eta_{motor}$$

where $\eta_{fan}$ is the fan efficiency, $\eta_{drive}$ is the efficiency of the drive, $\eta_{motor}$ is the motor efficiency. The fan efficiency is the ratio of work output to mechanical input, the drive efficiency is the ratio of electrical output to input, and the motor efficiency is the ratio of mechanical output to electrical input.

A number of different models can used to estimate the load exerted on cooling coil 26. However, a preferred technique determines the cooling load from a bypass factor approach as described by Kuehn et al., *Thermal Environmental Engineering*, Prentice-Hall Inc., Upper Saddle River, N.J., 1998.

In that technique, a determination first is made whether cooling coil 26 is dry. The following equation is employed to determine the temperature at which the coil transitions between a dry condition and a partially wet condition:

$$T^* = \beta T_m + (1-\beta) T_{dew,m}$$

where $T^*$ is the transition temperature, $\beta$ is the coil bypass factor, $T_m$ is the mixed air temperature, and $T_{dew,m}$ is the dew point temperature of the mixed air. The mixed air temperature and dew point temperature can be determined from previous equations, and the psychometric equations presented in ASHRAE *Handbook—Fundamentals*, supra. If the cool air temperature is greater than the transition temperature, cooling coil 26 is dry, otherwise cooling coil 26 is partially wet or wet.

If cooling coil 26 is dry, then the cooling load is derived from the expression:

$$\frac{\dot{Q}_c}{\dot{m}_a} = h_m - h_c$$

where $\dot{Q}'_C$ is the cooling load, $m_a$ is the mass flow rate of dry air, and $h_m$, and $h_C$ are the enthalpy of the mixed air and cooled air, respectively. The enthalpies are determined from the mixed air temperature and relative humidity, the cooled air temperature, the psychometric equations presented in 1997 ASHRAE *Handbook—Fundamentals*, supra and the following equation:

$$\omega_c = \omega_m$$

If cooling coil 26 is not dry, then the cooling load is derived from the expression:

$$\frac{\dot{Q}_c}{\dot{m}_a} = (1-\beta)(h_m - h_d) - h_w(1-\beta)(\omega_m - \omega_d)$$

where $\beta$ is the coil bypass factor, $h_d$ and $w_c$ are the enthalpy and humidity ratio of the saturated air, and $h_w$ is the enthalpy of condensate. The dew point temperature $T_{dew}$ for the saturated air is determined from:

$$T_{dew} = \frac{T_c - \beta T_m}{1 - \beta}$$

The enthalpy and the humidity ratio for the saturated air is determined from the dew point temperature and the ASHRAE psychometric equations. When controller 24 is operating in State 3, an estimate of the cooling load with the minimum and maximum flow rates of outdoor air are derived.

In an exemplary embodiment, a transition can occur from State 3 to either State 4 or 5 depending upon the values of these cooling load estimates. The transition occurs to State 4 when the estimated cooling load with maximum outdoor air $\dot{Q}_{MAX}$ is less than a predetermined percentage (i.e. 1-10 percent) of the estimated cooling load with minimum outdoor air $\dot{Q}_{MIN}$ for a period of thirty seconds. This predetermined percentage allows the control system to determine the position of the system on the psychometric chart. The transition occurs to State 5 when the estimated cooling load with maximum outdoor air $\dot{Q}_{MAX}$ is greater than a predetermined percentage of the estimated cooling load with minimum outdoor air $\dot{Q}_{MIN}$ for a period of thirty seconds. In State 5, the optimal fraction of outdoor air $\dot{Q}_{OPT}$ is determined by the extremum seeking control system.

In State 4, cooling coil 26 is active to apply mechanical cooling to the air while dampers 16, 20, and 22 are set in the minimum outdoor air positions. A transition occurs to State 3 when the estimated cooling load with minimum outdoor air $\dot{Q}_{MIN}$ is less than a predetermined percentage (i.e. 1-10 percent) greater than the estimated cooling load of the maximum outdoor air $\dot{Q}_{MAX}$ for a period of thirty seconds. A transition occurs from State 4 to State 5 when the estimated cooling load with minimum outdoor air $\dot{Q}_{MIN}$ is greater than a predetermined percentage of the estimated cooling load of the maximum outdoor air $\dot{Q}_{MAX}$ for a period of thirty seconds. In State 5, the optimal fraction of outdoor air $\dot{Q}_{OPT}$ is determined by the extremum seeking control system.

In State 5, dampers 16, 20, and 22 are extremum controlled to modulate the flow of chilled water to remove energy from the circulating air. At this time, the positions of dampers 16, 20, and 22 are dynamically varied to introduce outdoor air into the system. This dynamic system introduces an amount of outdoor air that approaches the optimal fraction of outdoor air for the system. A transition occurs to State 3 when the cooling load derived by extremum control with optimal fraction of outdoor air $\dot{Q}_{OPT}$ is greater than, or equal to, the estimated cooling load with the maximum outdoor air $\dot{Q}_{MAX}$ for a period of thirty seconds. A transition occurs from State 5 to State 4 when the cooling load derived by extremum control with optimal fraction of outdoor air $\dot{Q}_{OPT}$ is greater than, or equal to, the estimated cooling load with minimum outdoor air $\dot{Q}_{MIN}$ for a period of thirty seconds.

Figure 11:
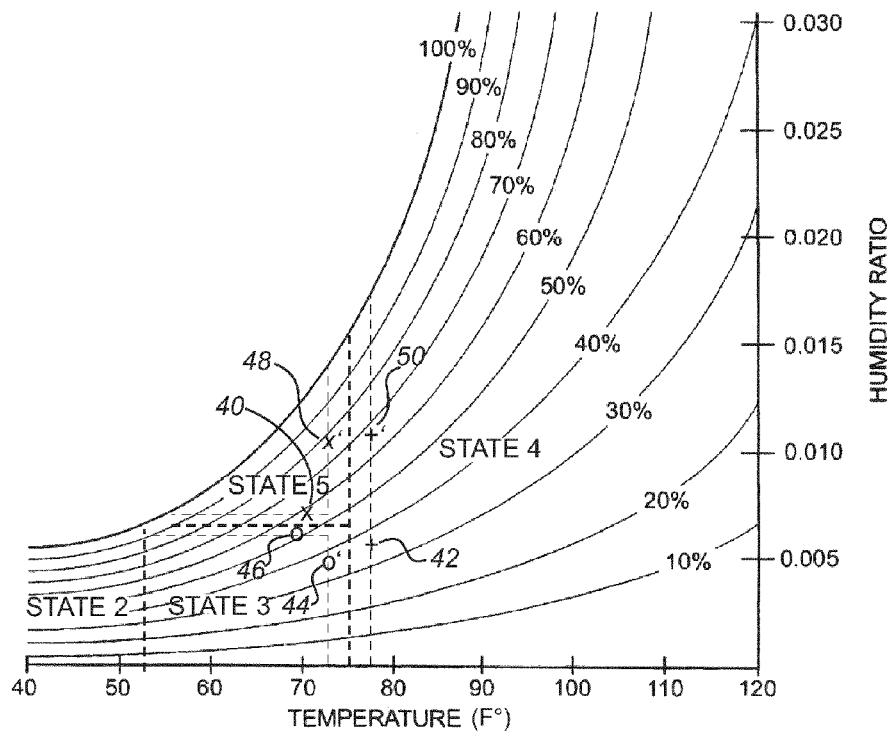
FIG. 11 is an exemplary psychometric chart depicting operation of the five states for a specific set of environmental conditions, according to an exemplary embodiment.

FIG. 11 shows that a transition from State 3 to State 4 occurs after the HVAC system reaches a transition line$_{34}$ 42 on the psychometric chart. The transition from State 3 to State 5 occurs after the HVAC system reaches a transition line$_{35}$ 40 on the psychometric chart. The transition from State 4 to State 5 occurs after the HVAC system reaches a transition line$_{45}$ 48 on the psychometric chart.

FIG. 11 also shows that a transition from State 5 to State 4 occurs after the HVAC system reaches a transition line$_{54}$ 50 on the psychometric chart. The transition from State 5 to State 3 occurs after the HVAC system reaches a transition line$_{53}$ 46 on the psychometric chart. The transition from State 4 to State 3 occurs after the HVAC system reaches a transition line$_{43}$ 44 on the psychometric chart.

Figure 12:
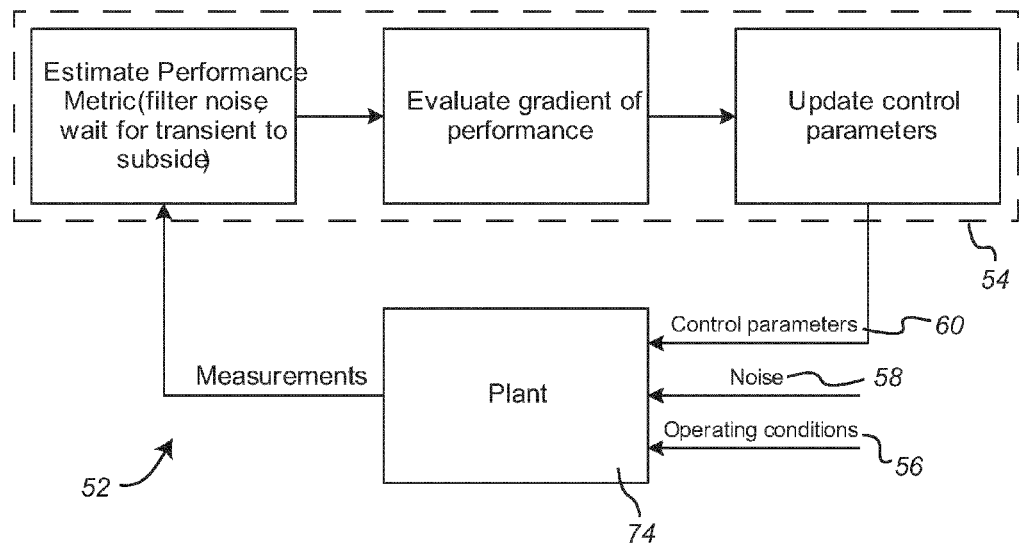
FIG. 12 is a diagram of an extremum seeking control system, according to an exemplary embodiment.
Figure 13:
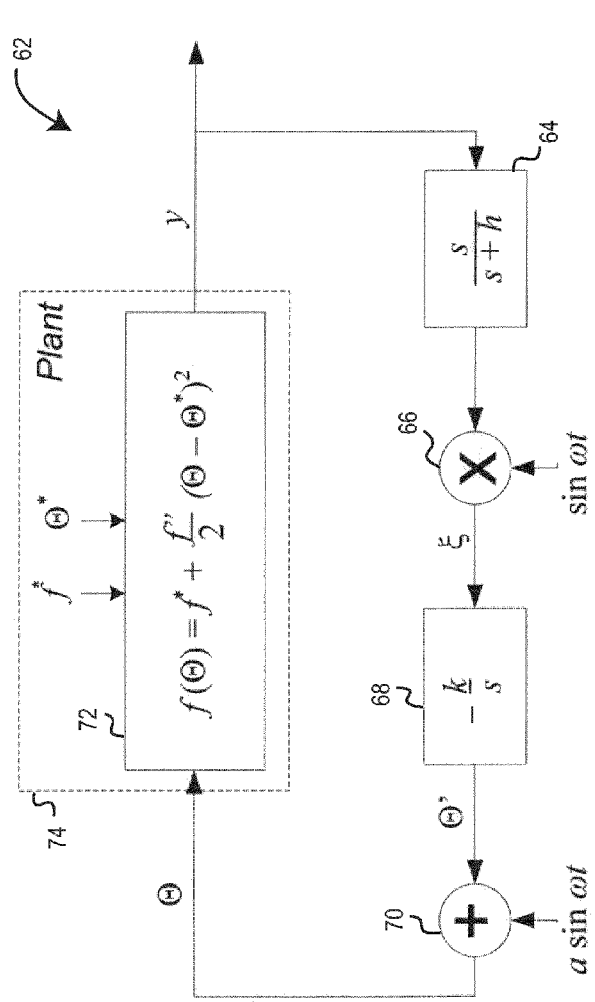
FIG. 13 is another diagram of an extremum seeking control system, according to an exemplary embodiment.
Figure 14:
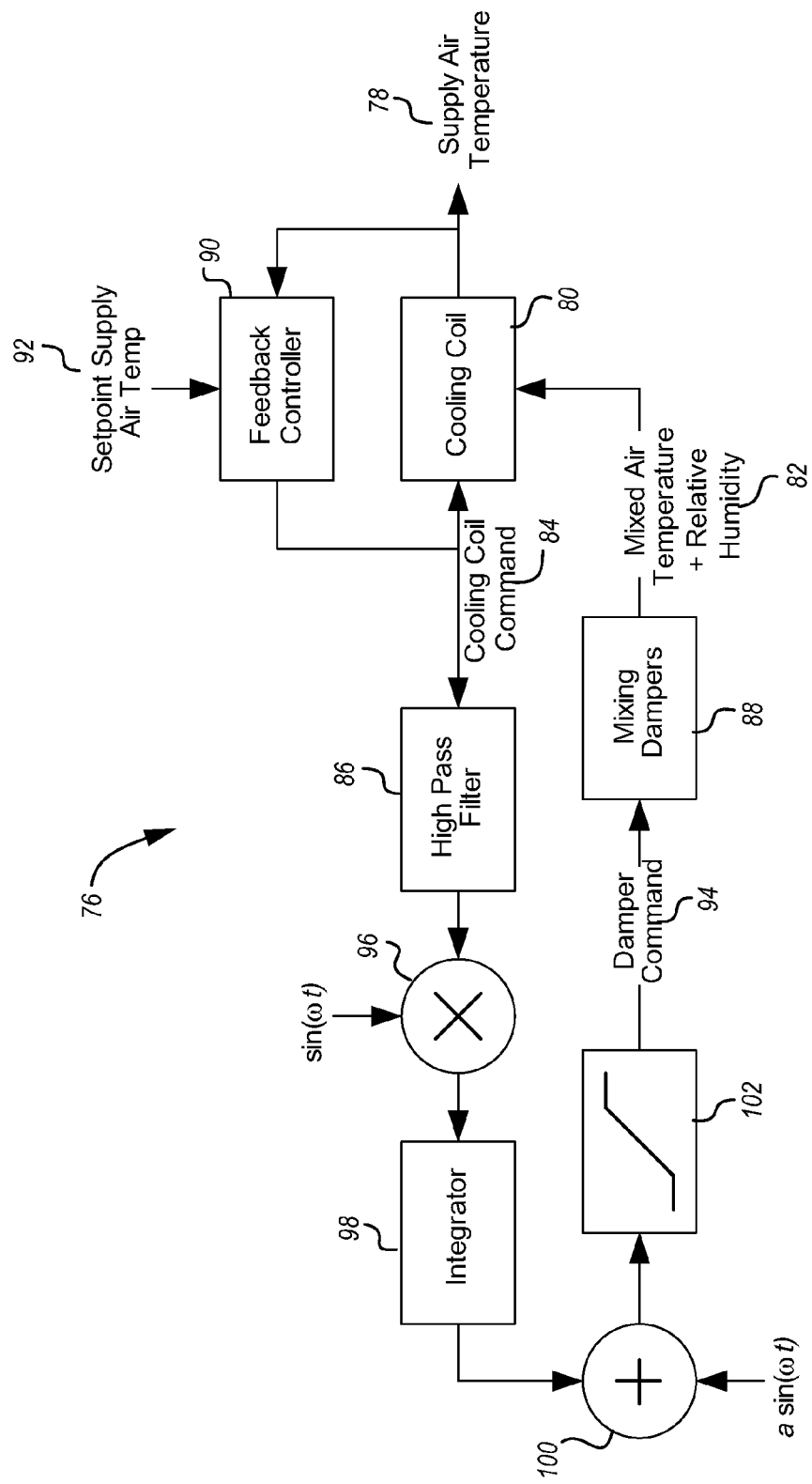
FIG. 14 is a diagram of a HVAC system in which an extremum seeking controller has been incorporated, according to an exemplary embodiment.

In FIGS. 12-14, an extremum control system 62 is shown. Extremum control is the tracking of a varying maximum and minimum parameter. The relationship between inputs and outputs in a static response curve is nonlinear in extremum control system 62. The extremum controller finds the optimum operating point and tracks it under varying conditions (e.g., changes in temperature, humidity ratio, etc.).

In FIG. 12, a basic extremum control system 52 is shown. The process can work in either an open loop or closed loop control system. A search algorithm 54 continually modifies the output of the process to approach the extremum despite a change in the process 56 or an influence of disturbances 58. The process communicates search algorithm 54 to plant 74. Search algorithm 54 determines a setpoint for the system. In addition to search algorithm 54 communicating the setpoint to a plant 74, plant 74 also receives change in the process 56 signal from the process. Plant 74 is configured to use either signal to modify the process. In an exemplary embodiment, plant 74 may use change in the process 56 signal from the process to provide a command 60 to the process to move the system towards the extremum. In another exemplary embodiment, plant 74 may use search algorithm 54 signal from to provide command 60 to the process to move the system towards the extremum.

In FIG. 13, a basic extremum seeking static map 62 is shown. Where y is the output to be minimized; f* is the minimum of the map; f" is the second derivative (positive–f (θ) has a min.); θ* is the unknown parameter; θ' is the estimate of θ*; k is the adaptation gain (positive) of the integrator 1/s (where s is the variable that results from Laplace transform); a is the amplitude of the probing signal; ω is the frequency of the probing signal; h is the cut-off frequency of the washout filter; + is "modulation" by summation and X is "demodulation" by multiplication. Where a washout filter is given by:

$$h = \frac{s}{s+h}$$

The extremum control system 62 starts with an estimate of the unknown parameter θ*. The control system uses this parameter to determine the optimum operating point and to track the optimum operating point as it varies. The output to be minimized y is transmitted to a washout filter 64. Washout filter 64 screens y and transmits the screened y to a multiplier 66. Multiplier 66 transmits ξ to an adaptation gain filter 68. Adaptation gain filter 68 transmits an estimate of θ* to an summation 70, which transmits a control signal to plant 74. In an exemplary embodiment, the algorithm for the extremum seeking system is a single parameter system. It is noted that the algorithm may have several or a plurality of parameters.

In FIG. 14, an extremum seeking control system 76 for a HVAC system is shown. Extremum seeking control system 76 includes a heat exchanger 80, a feedback controller 90, a high pass filter 86, a mixer 96, an integrator 98, an amplifier 100, a damper command control 102 and a mixing damper 88. Heat exchanger 80 lowers the temperature of the air. Feedback controller 90 maintains a supply air temperature 78 at a setpoint 92 by adjusting the position for chilled water valve of cooling coil 26 (FIG. 2). Damper command control 102 maintains dampers 16, 20, and 22 between 0% and 100% outside air.

Figure 15:
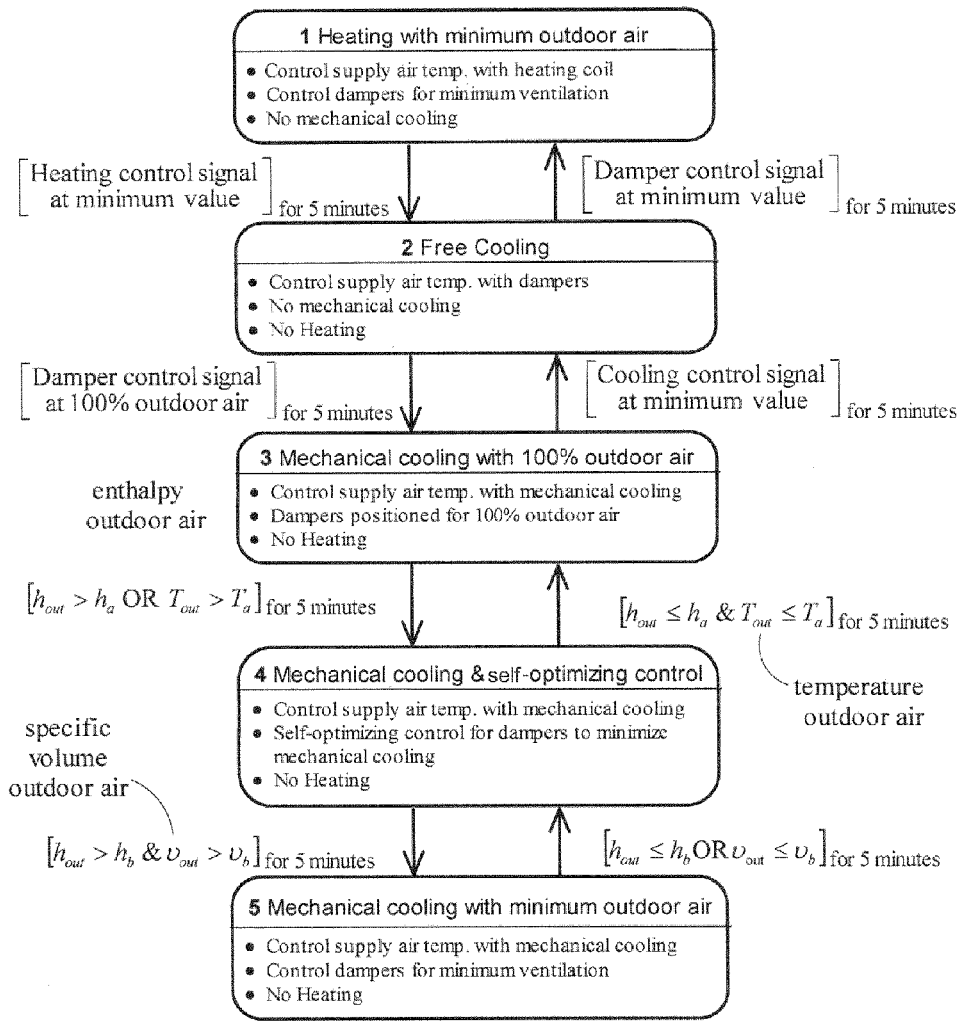
FIG. 15 is a state diagram of a finite state machine with five operating states that are implemented in the controller of the air-handling unit, according to an exemplary embodiment.

An exemplary embodiment of a finite state machine after the start up stage has been implemented, is shown in FIG. 15. In FIG. 15, a finite state machine for controlling an air-side economizer that uses self-optimizing control (also called extremum seeking control) to control dampers 16, 20, and 22 for one of the states. The numbers indicate the state number for the finite-state machine. The transitions between States 3 and 4 are based on temperature $T_a$ and enthalpy $h_a$. The temperature and relative humidity for thermodynamic State a are determined from:

$$T_a = T_r - T_{error}$$

$$\varnothing_a = \varnothing_r - \varnothing_{error}$$

Where $T_r$ and $\varnothing_r$ are the temperature and relative humidity of the return air. $T_{error}$ and $\varnothing_{error}$ are estimates of the errors for temperature and relative humidity sensors, respectively. Sensor errors can be caused by being out of calibration, being in a poor location, and the inherent accuracy of the sensor. Standard psychometric property calculation methods can be used to determine the enthalpy of the outdoor and State a from the temperatures and relative humidities. These standard psychometric property calculation methods can be found in Psychometrics Theory and Practice by the American Society of Heating, Refrigeration and Air-Conditioning Engineers, Inc. 1996, ISBN 1-883413-39-7.

Transitions between States 4 and 5 are based on enthalpies and specific volumes of the outdoor air conditions and thermodynamic State b. The temperature and relative humidity for State b are determined from:

$$T_b = T_r + T_{error}$$

$$\varnothing_b = \varnothing_r + \varnothing_{error}$$

The program Engineering Equation Solver (available at http://www.mhhe.com/engcs/mech/ees/download.html) was used to determine the regions of outdoor air conditions for the control States on a psychometric chart when the return conditions were 75° F. and 50% relative humidity (See FIG. 7). The air temperature after the coil was 53° F. The temperature error ($T_{error}$) was 1° F. and the relative humidity error ($\varnothing_{error}$) was 3%. FIG. 7 shows the outdoor air conditions on a psychometric chart for States 2 through 5. The thermodynamic location of States a 106 and State b 104 will vary depending on return air conditions, which are a function of supply air conditions, thermal gains and moisture gains in the space. In FIG. 7 there is no transition directly from State 3 to State 5. Therefore, the transition line 108 is where the control system will transition from State 3 to State 4 or vice versa. The transition line 110 is where the control system will transition from State 4 to State 5 or vice versa.

Simulations for an ideal coil model were used to determine three regions of optimal fraction of outdoor air to supply air: minimum (20%) outdoor air, between 20% and 100% outdoor air, and 100% outdoor air. (A 1-dimensional search was used to find the thermodynamic conditions for the transitions.) The simulations assumed ideal sensors. FIG. 8 shows the three areas of outdoor air and lines for the transitions between states.

Figure 16:
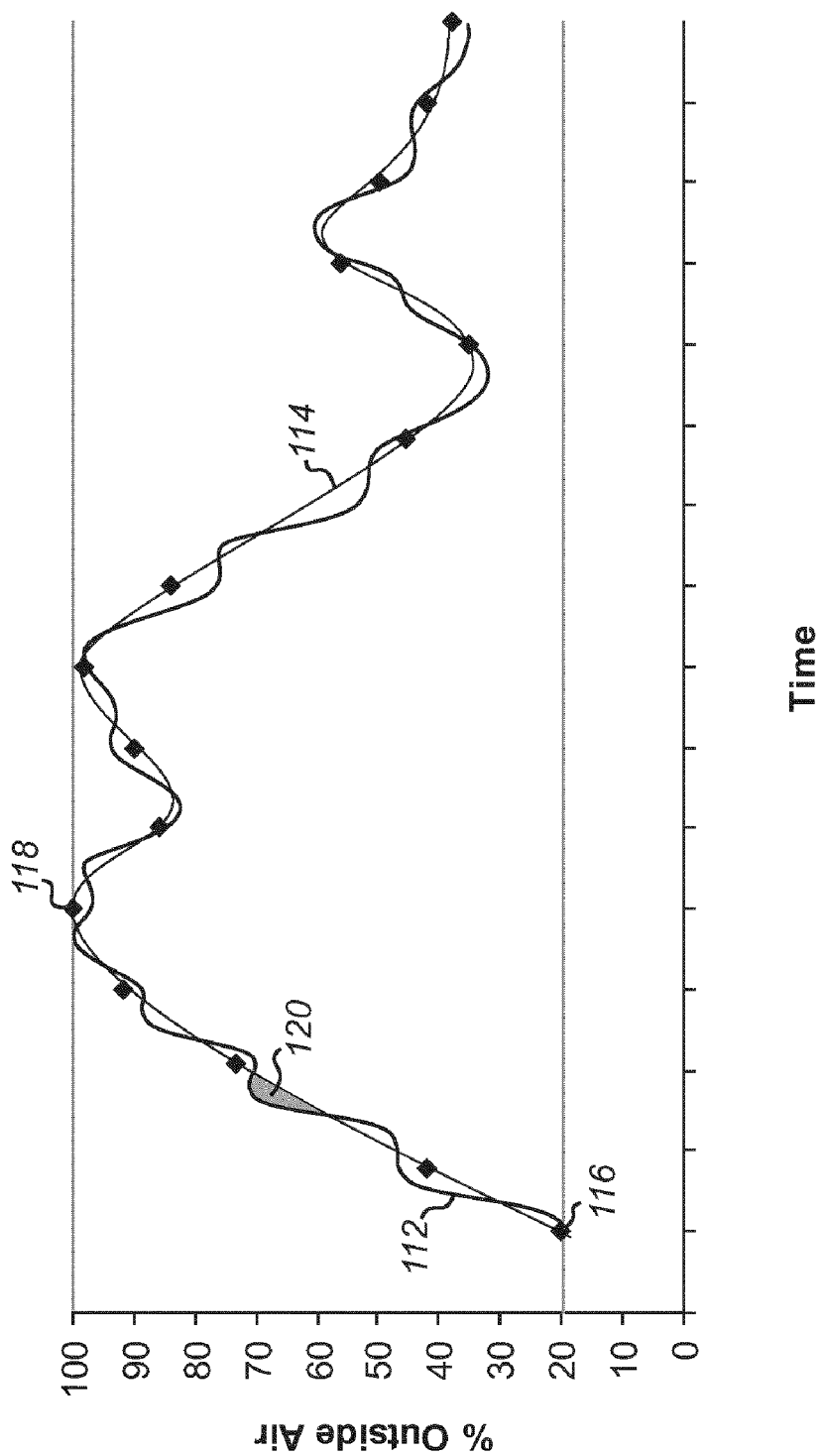
FIG. 16 shows the extremum-controlled HVAC system tracking the optimal solution, according to an exemplary embodiment.

FIG. 16 shows the extremum controlled system varying the percentage of outside air from twenty percent 116 to one hundred percent 118. The optimal percentage of outside air curve 114 is tracked by the extremum controlled outside air curve 112. The extremum controlled system tracks the optimal solution, which causes some inefficiency 120 in the system.

In an exemplary embodiment, the cooling coil control signal is a function of the load on cooling coil 26. The signal from cooling coil 26 is communicated to the control circuit. The control circuit utilizing extremum seeking logic modulates dampers 16, 20, and 22.

While the exemplary embodiments illustrated in the figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with figures should not be construed as imposing on the invention any limitations that may be present in the figures. The present invention contemplates methods, systems and program products on any machine-readable media for accomplishing its operations. The embodiments of the present invention may be implemented using an existing computer processors, by a special purpose computer processor for an appropriate HVAC system, or by an analog electrical circuit incorporated for this or another purpose or by a hardwired system.

It is important to note that the construction and arrangement of the adaptive real-time optimization control system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., air-handling unit), the position of elements may be reversed or otherwise varied (e.g., sensors), and the nature or number of discrete elements or positions may be altered or varied (e.g., sensors). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

As noted above, embodiments include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

What is claimed is:

1. A method for operating a system comprising an economizer having a damper for varying an amount of outdoor air introduced into a building, and having a mechanical temperature control element that removes heat from air provided to the building, the damper and the mechanical temperature control element being regulated by a computer controller in communication with at least two temperature sensors, the method comprising:
the computer controller performing the steps of:
providing a first operating state of the system which regulates the damper using an extremum seeking control to minimize the load on the mechanical temperature control element;
providing at least a second operating state of the system which regulates the damper without using the extremum seeking control;
receiving a plurality of sensor inputs from the at least two temperature sensors;
computing at least a first transition boundary between the first operating state and the second operating state of the system, based upon the received sensor inputs;
and transitioning from the first operating state to the second operating state in response to a comparison between the computed first transition boundary and at least one of the plurality of sensor inputs, and sending a control signal to an actuator for the damper based upon the operating state selected;
the method further comprising the actuator for the damper operating the damper according to the control signal sent to the actuator by the computer controller.

2. The method of claim 1, wherein in the second operating state the damper is not controlled using the extremum seeking controller and is positioned for providing a maximum amount of outdoor air to the building.

3. The method of claim 1, wherein the at least one transition boundary comprises:
a second transition boundary between the first operating state and a third operating state of the system, wherein in the third operating state the damper is not controlled using the extremum seeking control and is positioned for providing a minimum amount of outdoor air to the building.

4. The method of claim 1, wherein in the second operating state the damper is not controlled using the extremum seeking controller and is positioned for providing a maximum amount of outdoor air;

and wherein the at least one transition boundary further comprises a second transition boundary between the first operating state and a third operating state of the system, wherein in the third operating state the damper is not controlled using the extremum seeking control and is positioned for providing a minimum amount of outdoor air.

5. The method of claim 1, further comprising the computer controller calculating an outdoor air enthalpy using current values of the received plurality of sensor inputs and comparing the calculated outdoor air enthalpy to the at least one transition boundary.

6. The method of claim 5, wherein the at least one transition boundary is a calculated enthalpy value.

7. The method of claim 6, wherein the calculated enthalpy value is computed based on a sensor error.

8. The method of claim 6, wherein the calculated enthalpy value is computed based on a system model error.

9. The method of claim 6, wherein the at least one transition boundary is adjusted as the calculated enthalpy value varies to account for new outdoor air temperature and humidity values provided by the plurality of sensor inputs.

\* \* \* \* \*